(12) United States Patent
Saunders (10) Patent No.: US 10,455,975 B2
(45) Date of Patent: Oct. 29, 2019

(54) BEVERAGE PREPARATION MACHINE (71) Applicant: Koninklijke Douwe Egberts B.V., Utrecht (NL)

(72) Inventor: Tony Saunders, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 16/031,902

(22) Filed: Jul. 10, 2018

(65) Prior Publication Data

US 2018/0317700 A1 Nov. 8, 2018

Related U.S. Application Data

(62) Division of application No. 14/747,613, filed on Jun. 23, 2015, now Pat. No. 10,085,589.

(30) Foreign Application Priority Data

Oct. 30, 2014 (GB) .................................. 1419347.8

(51) Int. Cl.
*A47J 31/44* (2006.01)
*A47J 31/46* (2006.01)
(Continued)

(52) U.S. Cl.
CPC ........... *A47J 31/462* (2013.01); *A47J 31/005* (2013.01); *A47J 31/407* (2013.01); *A47J 31/4403* (2013.01)

(58) Field of Classification Search
CPC .................... A47J 31/10–14; A47J 31/44–441
(Continued)

(56) References Cited

U.S. PATENT DOCUMENTS 7,997,187 B2 8/2011 Garman
8,800,431 B2 8/2014 Sullivan
(Continued)

FOREIGN PATENT DOCUMENTS

CN 101268914 9/2008
CN 101721135 6/2010
(Continued)

OTHER PUBLICATIONS

Combined Search and Examination Report, dated Apr. 27, 2015 for Application No. GB1419347.8 (7 pgs.).
(Continued)

*Primary Examiner* — Michael A Laflame, Jr.
(74) *Attorney, Agent, or Firm* — Fitch, Even, Tabin & Flannery LLP (57) ABSTRACT

A beverage preparation machine includes a main housing, a brew head having an outlet for discharging a prepared beverage, a water reservoir, and a water path for conveying water from the water reservoir to the brew head. The water reservoir is movable with respect to the main housing between a storage configuration and a beverage dispensing configuration. The water reservoir may be non-removable from the main housing. The water reservoir may be located laterally off-set from a midline of the main housing in the beverage dispensing configuration so as to increase the overall width of the beverage preparation machine compared to the width in the storage configuration. The water reservoir may include a dual-purpose lid.

5 Claims, 10 Drawing Sheets (51) Int. Cl.
*A47J 31/00* (2006.01)
*A47J 31/40* (2006.01)

(58) Field of Classification Search
USPC .......... 99/279–280, 284, 294–295, 300–304
See application file for complete search history.

(56) References Cited

U.S. PATENT DOCUMENTS

| | | | |
|---|---|---|---|
| 8,978,542 | B2 | 3/2015 | Talon |
| 10,064,517 | B2* | 9/2018 | Ou .......................... A47J 31/465 |
| 2003/0037680 | A1 | 2/2003 | Rolland |
| 2007/0034086 | A1 | 2/2007 | Colman |
| 2010/0107887 | A1 | 5/2010 | Bentley |
| 2011/0265658 | A1 | 11/2011 | Talon |
| 2012/0052171 | A1 | 3/2012 | Starr |
| 2013/0213238 | A1 | 8/2013 | Cahen |
| 2015/0144004 | A1* | 5/2015 | Fin .......................... A47J 31/44 99/300 |
| 2017/0079462 | A1* | 3/2017 | Ait Bouziad ....... A47J 31/3623 |
| 2018/0360261 | A1* | 12/2018 | Picozza ............... A47J 31/0631 |

FOREIGN PATENT DOCUMENTS

| | | |
|---|---|---|
| CN | 102281804 | 12/2011 |
| DE | 102013105194 | 11/2013 |
| WO | 0172189 | 10/2001 |
| WO | 2011089210 | 7/2011 |
| WO | 2013104643 | 7/2013 |
| WO | 2013175346 | 11/2013 |

OTHER PUBLICATIONS

International Search Report and Written Opinion of the International Searching Authority, dated Dec. 10, 2015 for International Application No. PCT/IB2015/001110 (17 pgs.).

International Preliminary Report on Patentability dated May 2, 2017, for International Application No. PCT/IB2015/001110 (10 pgs.).

Notification of the First Office Action, dated Nov. 2, 2018, for corresponding Chinese Application No. 201580063962.4, with English translation (14 pgs.).

* cited by examiner

BEVERAGE PREPARATION MACHINE

CROSS-REFERENCE TO RELATED APPLICATION

This application is a divisional of U.S. application Ser. No. 14/747,613, filed Jun. 23, 2015, which claims benefit from Great Britain Application No. 1419347.8, filed Oct. 30, 2014, and which are hereby incorporated herein by reference in their entirety.

FIELD

The present disclosure relates to a beverage preparation machine. In particular, it relates to a compact beverage preparation machine.

BACKGROUND

Beverage preparation machines for producing beverages such as coffee and tea are known in the art. In recent years beverage preparation machines have been developed for domestic use which utilise pre-packaged containers of beverage ingredients. These containers may take a range of forms including, for example, porous pads, sachets, pods, capsules and cartridges. Typically, such beverage preparation machines are configured to dispense hot beverages such as coffee and tea but may also be used to dispense other beverages. In the domestic setting it is normal to position the beverage preparation machine on a worktop in a room such as a kitchen where it is close to sources of water and electrical power. However, known beverage preparation machines, in particular those configured to dispense from pre-packaged containers of beverage ingredients, may take up valuable worktop space which may be needed at other times for other reasons, e.g. food preparation. However, such beverage preparation machines are not routinely put away off the worktop when not in use since such beverage preparation machines are usually relatively heavy due to dense internal components such as pumps and water heaters.

SUMMARY OF THE DISCLOSURE

According to a first aspect of the present disclosure there is provided a beverage preparation machine comprising:
a main housing;
a brew head having an outlet for discharging a prepared beverage;
a water reservoir; and
a water path for conveying water from the water reservoir to the brew head;
wherein, the water reservoir is movable with respect to the main housing from a storage configuration, in which the water reservoir is located at least partially beneath the brew head, and a beverage dispensing configuration, in which the water reservoir is moved away from underneath the brew head so as to create a void space beneath the outlet of the brew head; and
wherein the water reservoir is non-removable from the main housing.

Advantageously, by making the water reservoir movable between storage and beverage dispensing configurations a more compact storage format of the beverage preparation machine can be achieved. In addition, by locating the water reservoir in the storage configuration at least partially beneath the brew head the beverage preparation machine can be made even more compact in its storage configuration compared to known beverage preparation machines. This may be achieved by changing the normal layout for domestic beverage preparation machines so that in the storage configuration the water reservoir is located underneath the brew head (typically at a front of the beverage preparation machine) rather than, say, at a rear of the beverage preparation machine distal the brew head which tends to increase the overall depth of the beverage preparation machine. The void space beneath the outlet of the brew head created in the beverage dispensing configuration may be used to receive a receptacle, for example a cup, mug or carafe, into which the prepared beverage is dispensed. Thus, according to the present disclosure, the void space for the receptacle is created only when needed. The more compact storage configuration of the beverage preparation machine has the advantage that less worktop space is taken up by the beverage preparation machine when it is not being used. This reduces the need or desire to put the beverage preparation machine away off the worktop between uses. If and when the beverage preparation machine is put away then the compact storage configuration reduces the space required.

The water reservoir in this aspect of the present disclosure is designed not be disconnected from the main housing during use, even during refilling or emptying of the water reservoir. Thus, there may be a permanent connection between the water reservoir and the water path and the connection may only require a non-return valve to prevent fluid flow from the main housing into the water reservoir. Configuring the water reservoir as non-removable from the main housing allows for a simpler, more compact design since no seatable valve needs to be provided in a base of the water reservoir and no water reservoir station with a matching valve seat is required.

In the storage configuration the water reservoir may be located at least partially beneath the outlet of the brew head.

The water reservoir may be pivotally connected to the main housing at a pivot point to enable the water reservoir to be pivoted between its storage configuration and beverage dispensing configuration. The pivot point may have an axis of rotation which is vertical. This may be particularly preferred where the water reservoir is elongate having a height which is relatively large compared to its width and depth. The pivot point may be located at a front corner of the main housing.

The water path may comprise a flexible conduit which may extend through the pivot point to provide fluid communication between the water reservoir and the main housing.

Preferably the water reservoir comprises a body that is at least partially transparent to allow a user to see at a glance the level of water contained in the water reservoir. In this way, the beverage preparation machine of the present disclosure may be configured without a water level sensor in the water reservoir if so desired.

The water reservoir may have a relatively small volume in order to reduce the size of the overall beverage preparation machine. For example, the volume of the water reservoir may be 700 ml or less.

The main housing may comprise at least a front face, two side faces and a rear face, wherein in use a receptacle for receiving a dispensed beverage may be located in front of the front face; wherein the water reservoir when in the storage configuration may be positioned adjacent the front face.

Preferably a width of the water reservoir is limited such that when in the storage configuration the water reservoir does not extend beyond either of the two side faces of the main housing.

In the beverage dispensing configuration the water reservoir may extend laterally from the main housing so as to increase the overall width of the beverage preparation machine compared to the width of the beverage preparation machine in the storage configuration. Advantageously, this increases the stability of the beverage preparation machine in the beverage dispensing configuration. It also allows the main housing of the beverage preparation machine to be made narrower since, in the beverage dispensing configuration, the stability of the overall beverage dispensing machine is not dependent only on the main housing. Rather, the water reservoir acts as an additional stabilising means.

The water reservoir may comprise a dual-purpose lid which may be mounted on the water reservoir when the water reservoir is in the storage configuration to close a mouth of the water reservoir, and which may be connected to the main housing to form a cup stand for a receptacle when the water reservoir is in the beverage dispensing configuration. Advantageously, this reduces the number of components required for the beverage preparation machine, allowing a reduction in manufacturing costs and allowing a more compact storage configuration to be achieved.

A front face of the main housing may comprise one or more sets of mounting points for connection of the dual-purpose lid. For example, two sets of mounting points may be provided at different heights to allow the dual-purpose lid to be positioned at a lower location and a higher location for accommodating taller and shorter receptacles respectively. In addition, even taller receptacles may be accommodated by not using the dual-purpose lid and instead resting the receptacle on the worktop.

The dual-purpose lid may comprise a receptacle for collection of liquid in use when functioning as a cup stand. The receptacle may be defined by a base wall and an upstanding side wall, wherein the upstanding side wall preferably has a height in the range of 2 to 12 mm and/or a volume of liquid able to be held by the receptacle is preferably in the range of 6 to 15 ml. The receptacle may be sub-divided into a plurality of segments by a series of ribs, wherein an upper free edge of the ribs may form a plurality of support points for a receptacle when the dual-purpose lid is functioning as a cup stand. A base wall of the receptacle may be un-apertured.

In the storage configuration the beverage preparation machine may have a footprint of less than or equal to 250 mm in depth and less than or equal to 100 mm in width. In one example the footprint is 235 mm in depth and 95 mm in width. When the water reservoir is moved into the beverage dispensing configuration the overall width of the beverage dispensing machine may be increased, for example, from 95 mm to 184 mm which increases the stability of the beverage preparation machine as discussed above. The height of the beverage preparation machine may be as little as 260 mm or less.

Activation of the beverage preparation machine may commence automatically on closure of the brew head. Advantageously, this allows both for easier operation of the beverage preparation machine and removes the need to provide a dedicated start button for operation. This allows a reduction in costs and the size of the main housing.

The beverage preparation machine may be configured for dispensing beverages from capsules, cartridges, pods, sachets or porous pads. For example, the brew head may by shaped, sized and configured to receive one or more types of pre-packaged containers. Considering the preferred compact size of the present beverage preparation machine the pre-packaged containers are preferably configured to dispense single serving sizes of beverage.

In a second aspect, the present disclosure provides a beverage preparation machine comprising:
 a main housing;
 a brew head having an outlet for discharging a prepared beverage;
 a water reservoir; and
 a water path for conveying water from the water reservoir to the brew head;
 wherein, the water reservoir is movable with respect to the main housing between a storage configuration and a beverage dispensing configuration, wherein in the storage configuration the water reservoir is located at a front of the beverage preparation machine; and
 wherein in the beverage dispensing configuration the water reservoir is located laterally off-set from a midline of the main housing so as to increase the overall width of the beverage preparation machine compared to the width in the storage configuration.

The water reservoir may form a stabilising means in the beverage dispensing configuration.

As discussed above, locating the water reservoir at the front of the beverage preparation machine may allow for a more compact storage configuration of the beverage preparation machine. In addition, locating the water reservoir at the front allows for easier access by a user to the water reservoir in contrast to a water reservoir located at a rear of the beverage preparation machine. This is particularly useful in the optional case where the water reservoir is non-removable from the main housing.

Further, as discussed above, locating the water reservoir laterally off-set from a midline of the main housing in the beverage dispensing configuration so as to increase the overall width of the beverage preparation machine increases the stability of the beverage preparation machine. It also allows the main housing of the beverage preparation machine to be made narrower since, in the beverage dispensing configuration, the stability of the overall beverage dispensing machine is not dependent only on the main housing. Rather, the water reservoir acts as an additional stabilising means.

In the same manner as the first aspect, the water reservoir may be pivotally connected to the main housing at a pivot point to enable the water reservoir to be pivoted between its storage configuration and beverage dispensing configuration; and preferably the pivot point has an axis of rotation which is vertical. In addition, the water path may comprise a flexible conduit which extends through the pivot point to provide fluid communication between the water reservoir and the main housing.

In a third aspect, the present disclosure provides a beverage preparation machine comprising:
 a main housing;
 a brew head having an outlet for discharging a prepared beverage;
 a water reservoir; and
 a water path for conveying water from the water reservoir to the brew head;
 wherein, the water reservoir is movable with respect to the main housing from a storage configuration, in which the water reservoir is located at least partially beneath the brew head, and a beverage dispensing configuration, in which the water reservoir is moved away from underneath the brew head so as to create a void space beneath the outlet of the brew head; and wherein the water reservoir comprises a dual-purpose lid which may be mounted on the water reservoir when the water reservoir is in the storage configuration to close a mouth of the water reservoir, and which may be connected to the main housing to form a cup stand for a receptacle when the water reservoir is in the beverage dispensing configuration.

Advantageously, use of a dual-purpose lid reduces the number of components required for the beverage preparation machine, allowing a reduction in manufacturing costs and allowing a more compact storage configuration to be achieved.

A front face of the main housing may comprise one or more sets of mounting points for connection of the dual-purpose lid. For example, two sets of mounting points may be provided at different heights to allow the dual-purpose lid to be positioned at a lower location and a higher location for accommodating taller and shorter receptacles respectively. In addition, even taller receptacles may be accommodated by not using the dual-purpose lid and instead resting the receptacle on the worktop.

The dual-purpose lid may comprise a receptacle for collection of liquid in use when functioning as a cup stand; and preferably the receptacle is defined by a base wall and an upstanding side wall, wherein the upstanding side wall preferably has a height in the range of 2 to 12 mm and/or a volume of liquid able to be held by the receptacle is preferably in the range of 6 to 15 ml.

The receptacle may be sub-divided into a plurality of segments by a series of ribs, wherein an upper free edge of the ribs forms a plurality of support points for a receptacle when the dual-purpose lid is functioning as a cup stand; and preferably the base wall of the receptacle is un-apertured.

The above aspects may further comprise one or more of the following features, singly or in combination:

The water path may comprise, for example, a pump for conveying water from the water reservoir through the water path and a heater for heating the water prior to it reaching the brew head. The heater may be an instantaneous flow heater.

There may be incorporated in the beverage preparation machine means for identifying the pre-packaged container inserted in the brew head. For example, this may be a bar code reader for reading a bar code on the pre-packaged container, an RFID reader for reading an RFID tag on or in the pre-packaged container, etc.

The main housing may include internal cable storage for holding a power cord of the beverage preparation machine.

The main housing may be provided with a visual indicator for displaying machine status to a user. Preferably the visual indicator may be an LED indictor. A single LED indicator may be used to allow for a simple configuration—this is particularly appropriate where the beverage preparation machine is designed to activate the dispensing of a beverage automatically on closure of the brew head.

The beverage preparation machine of the present disclosure may be configured to dispense a wide range of beverages. In one example the beverage preparation machine is enabled to dispense coffee beverages.

BRIEF DESCRIPTION OF THE DRAWINGS

Examples of the present disclosure will now be described in more detail, for exemplary purposes only, with reference to the accompanying drawings, in which.

DETAILED DESCRIPTION

Figure 1:
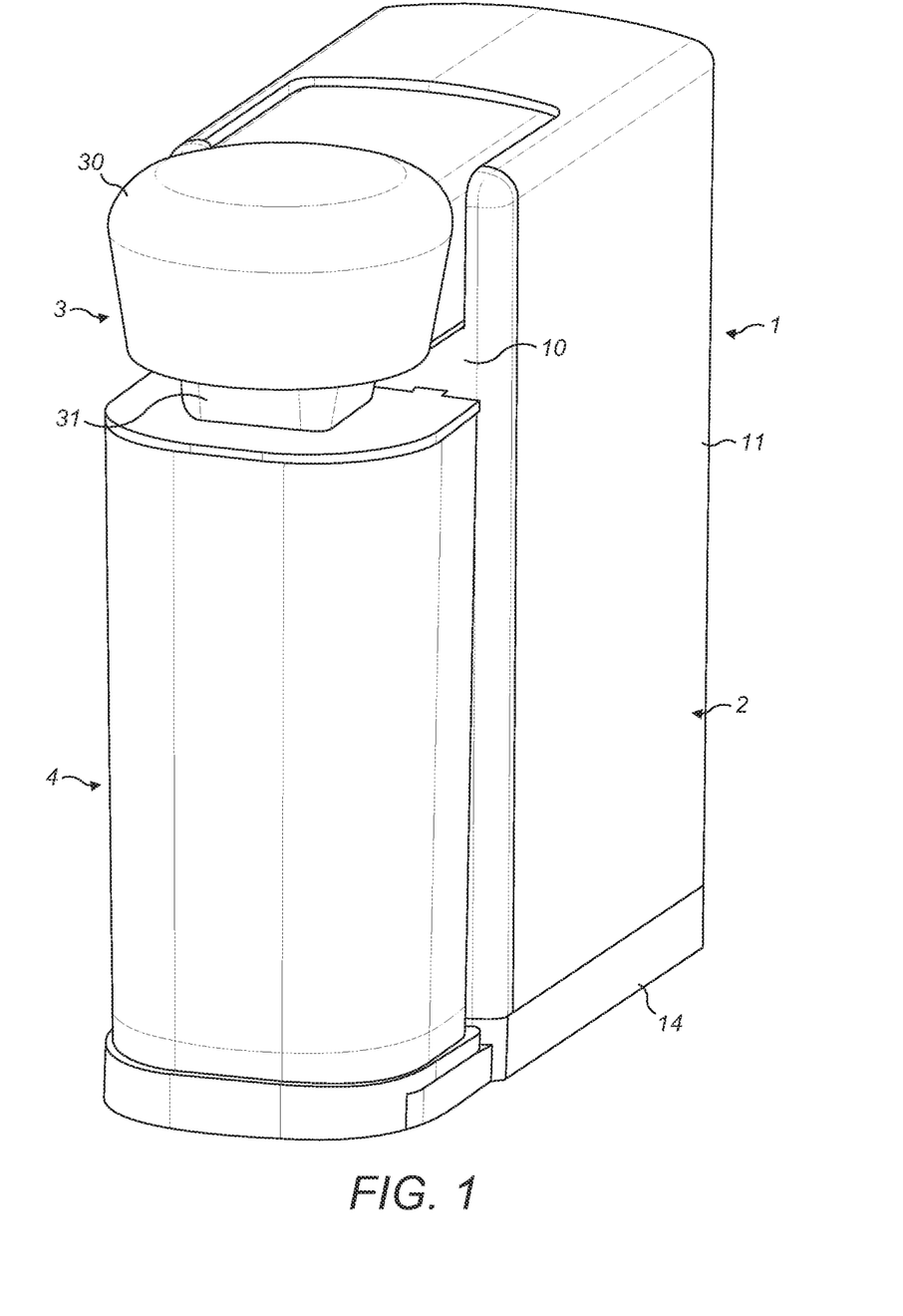
FIG. 1 is a perspective view of a beverage preparation machine according to the present disclosure in a storage configuration.
Figure 2:
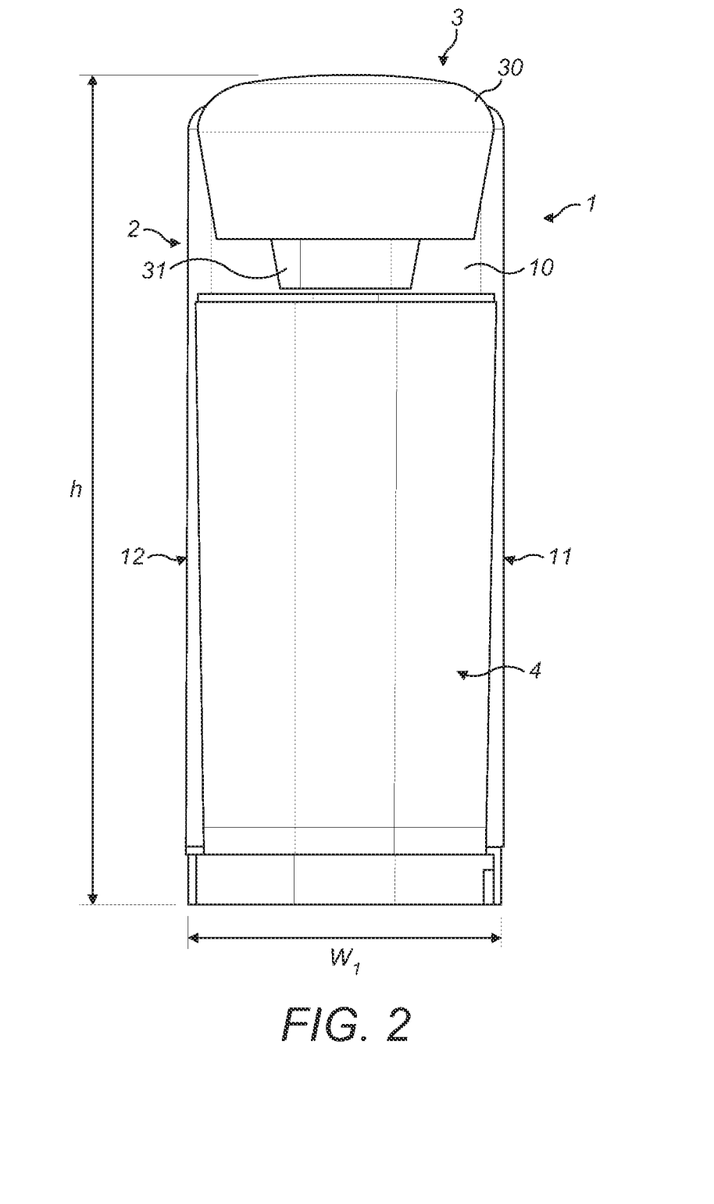
FIG. 2 is a front view of the beverage preparation machine of FIG. 1.
Figure 3:
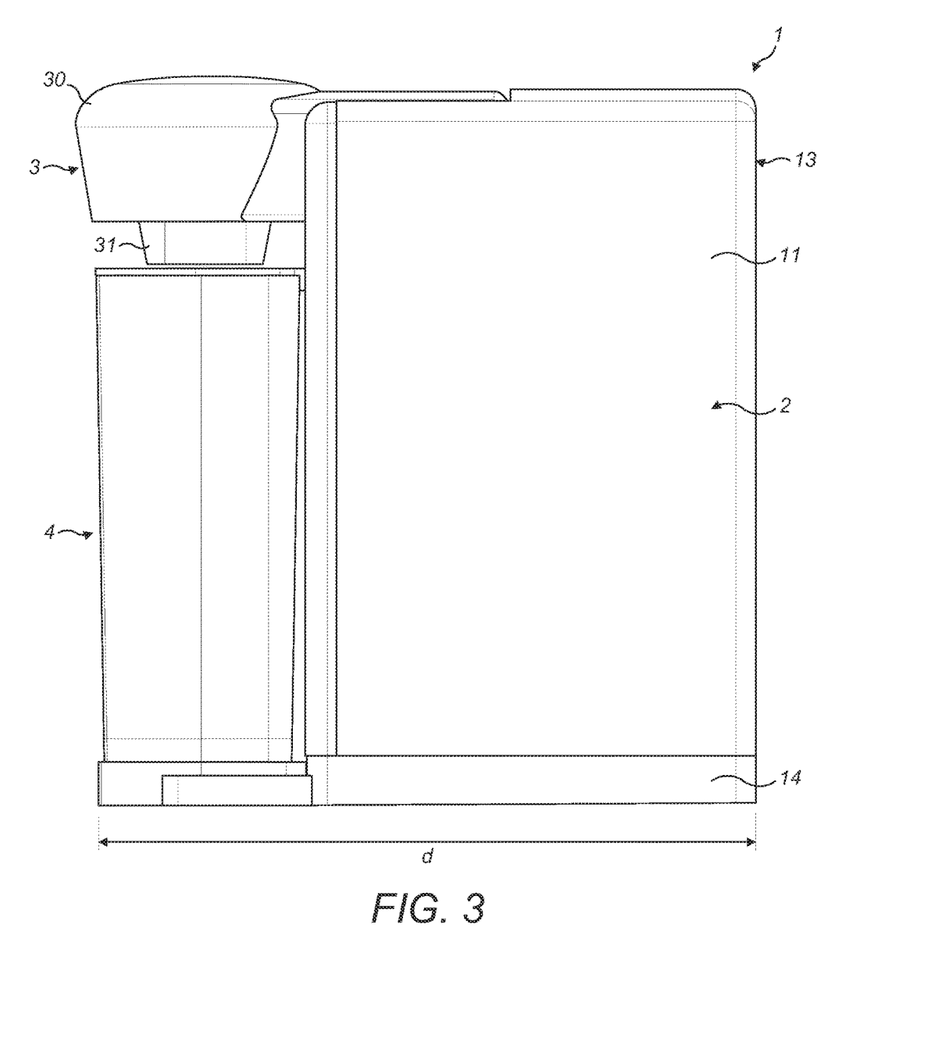
FIG. 3 is a side view of the beverage preparation machine of FIG. 1.

FIGS. 1 to 3 illustrate an embodiment of a beverage preparation machine 1 according to the present disclosure. The beverage preparation machine 1 comprises a main housing 2, a brew head 3 and a water reservoir 4. In FIGS. 1 to 3 the beverage preparation machine 1 is shown in a storage configuration. In this configuration the beverage preparation machine cannot be used to dispense a beverage.

The main housing 2 comprises a base 14 having mounted thereto one or more panels forming a front face 10, two side faces 11, 12 and a rear face 13 of the main housing 2. The main housing 2 has a generally parallelepiped shape and the overall beverage preparation machine 1 has a relatively small width $w_1$ in its storage configuration compared to its height h and depth d. In one example the width $w_1$ is 95 mm, the height h is 260 mm and the depth d is 235 mm.

The brew head 3 comprises a brew head body 30 which projects from the main housing 2. The brew head body 30 may be formed unitarily with the main housing 2 or may be otherwise mounted or connected thereto. A brew head outlet 31 is provided on a lower side of the brew head body 30 from which beverage, in use, is discharged. The brew head 3 may be configured to receive and hold one or more types of pre-packaged containers of beverage ingredients. To allow insertion and removal of the pre-packaged containers the brew head 3 may comprise upper and lower parts that can be moved relative to one another to open and close the brew head 3. The beverage preparation machine 1 may be configured to activate and commence dispensation of a beverage automatically on closure of the brew head 3.

The water reservoir 4 comprises a body 40 formed from a transparent or translucent material and a base 41 to which the body 40 is fixedly mounted. The body 40 has an upper mouth 44 through which the water reservoir 4 can be filled. A dual-purpose lid 50 is provided for selectively closing the upper mouth 44 which will be described further below. The water reservoir 4 has a relatively small volume for water of up to about 700 ml. Preferably the width of the water reservoir 4 is no greater than the width $w_1$ of the main housing 2 such that when in the storage configuration the water reservoir 4 does not extend beyond either of the two side faces 11, 12 of the main housing 2 as shown in FIG. 2.

The beverage preparation machine 1 comprises a water path that extends from the water reservoir 4 to the brew head and is used to convey water during use. The water path may comprise a plurality of components including conduits, such as flexible hoses or pipes for transporting water as well as units such as pumps, heaters and valves.

Figure 4:
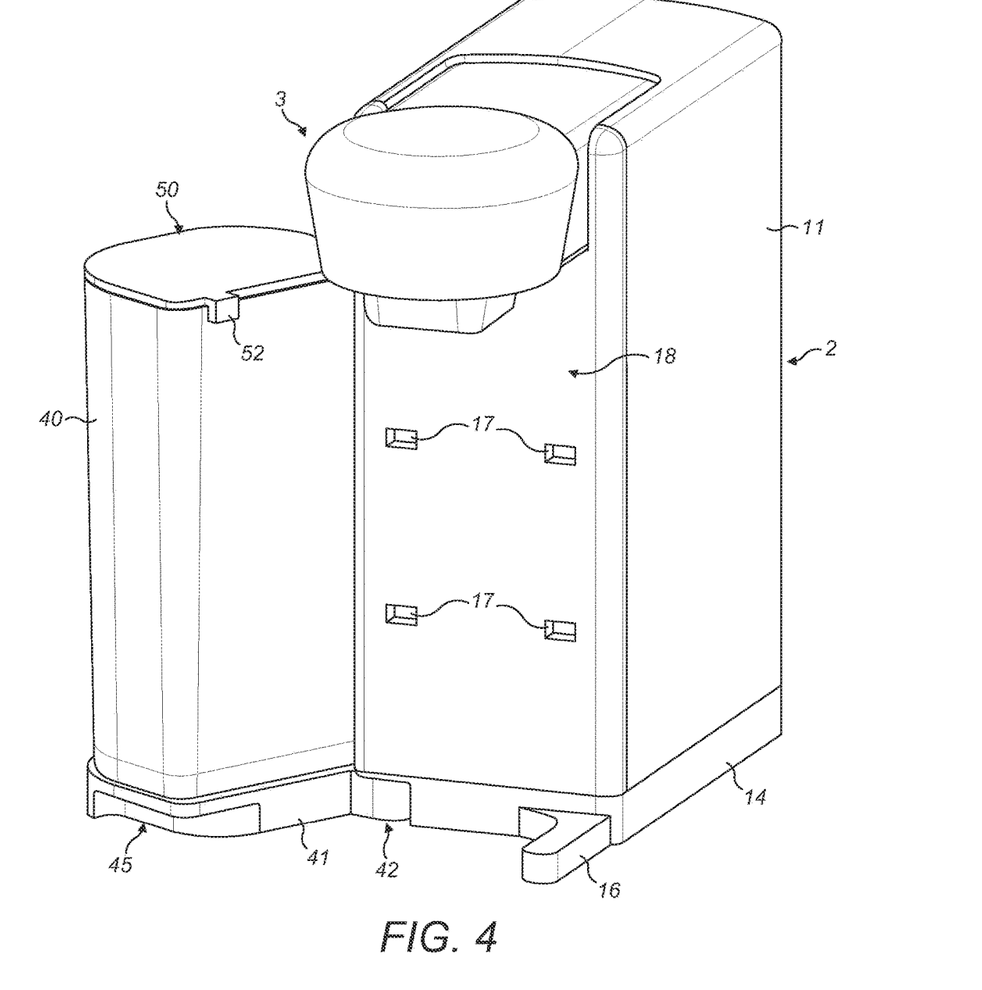
FIG. 4 is a perspective view of the beverage preparation machine of FIG. 1 in a beverage dispensing configuration.
Figure 5:
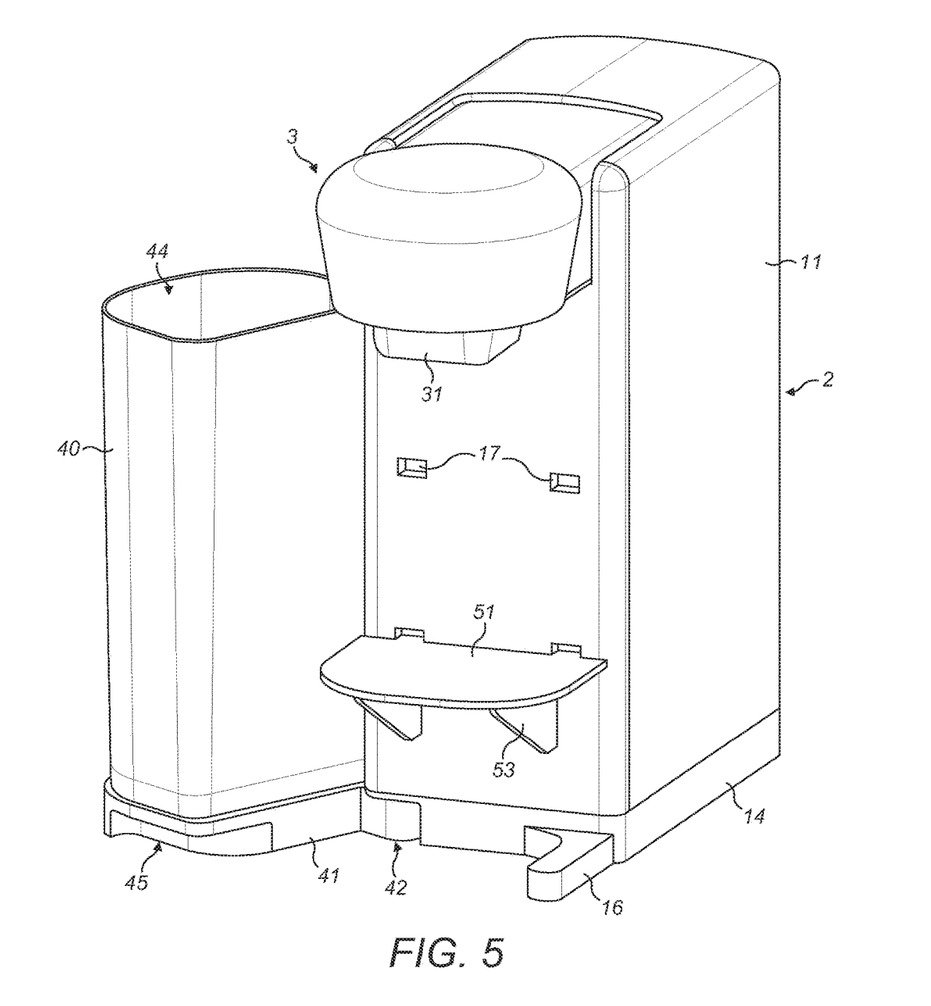
FIG. 5 is a perspective view of the beverage preparation machine in the beverage dispensing configuration and with a dual-purpose lid mounted to a main housing as a cup stand.
Figure 6:
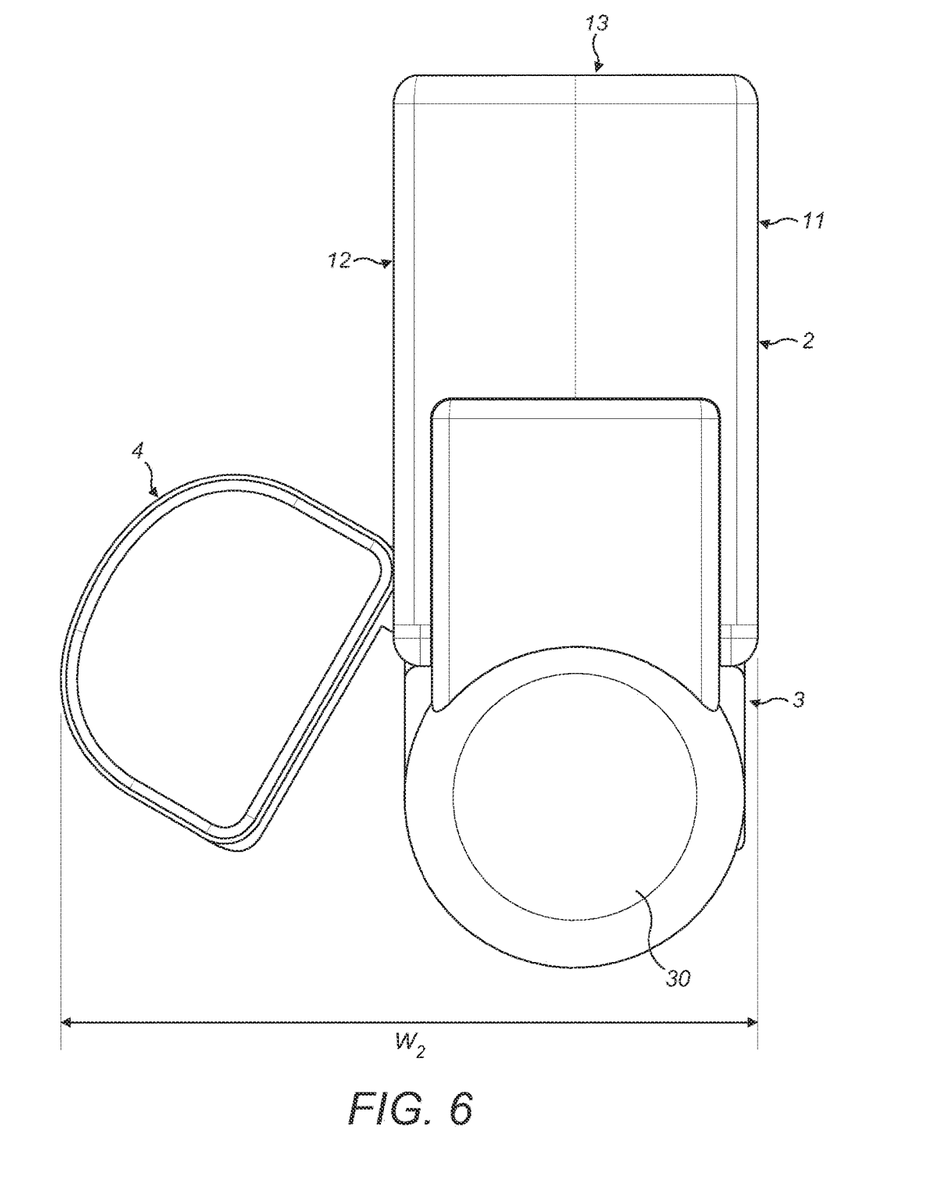
FIG. 6 is a top plan view of the beverage preparation machine of FIG. 5.

FIGS. 4 to 6 illustrate how the water reservoir 4 is movable to allow the beverage preparation machine 1 to adopt a beverage dispensing configuration as well as its storage configuration. In the present example, the water reservoir 4 is pivotally rotatable about a pivot point 42 located at a front corner of the main housing 2 at the junction between the front face 10 and the side face 12.

Figure 7:
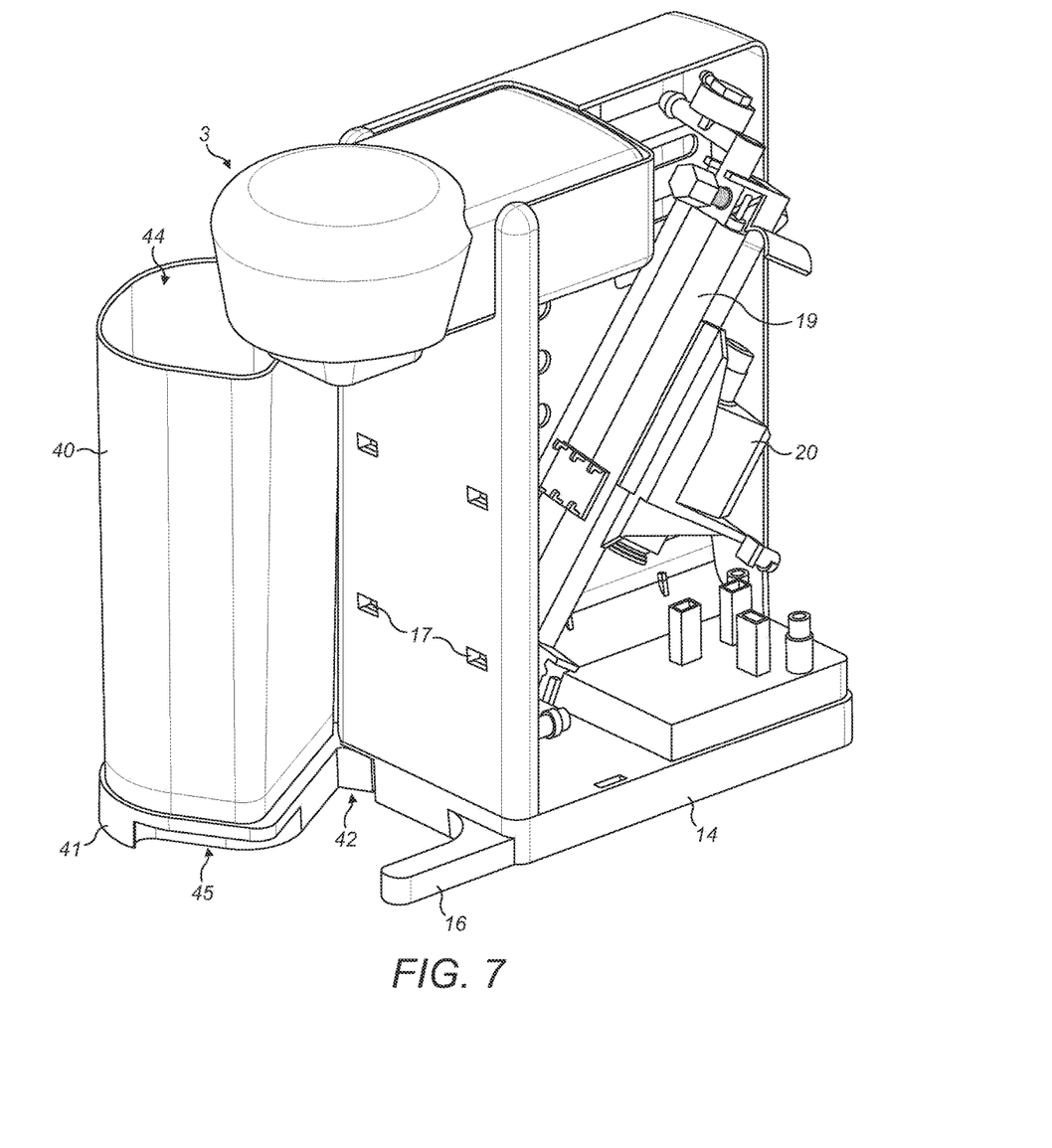
FIG. 7 is a perspective view of the beverage preparation machine of FIG. 4 with some parts omitted to show inner detail.
Figure 8:
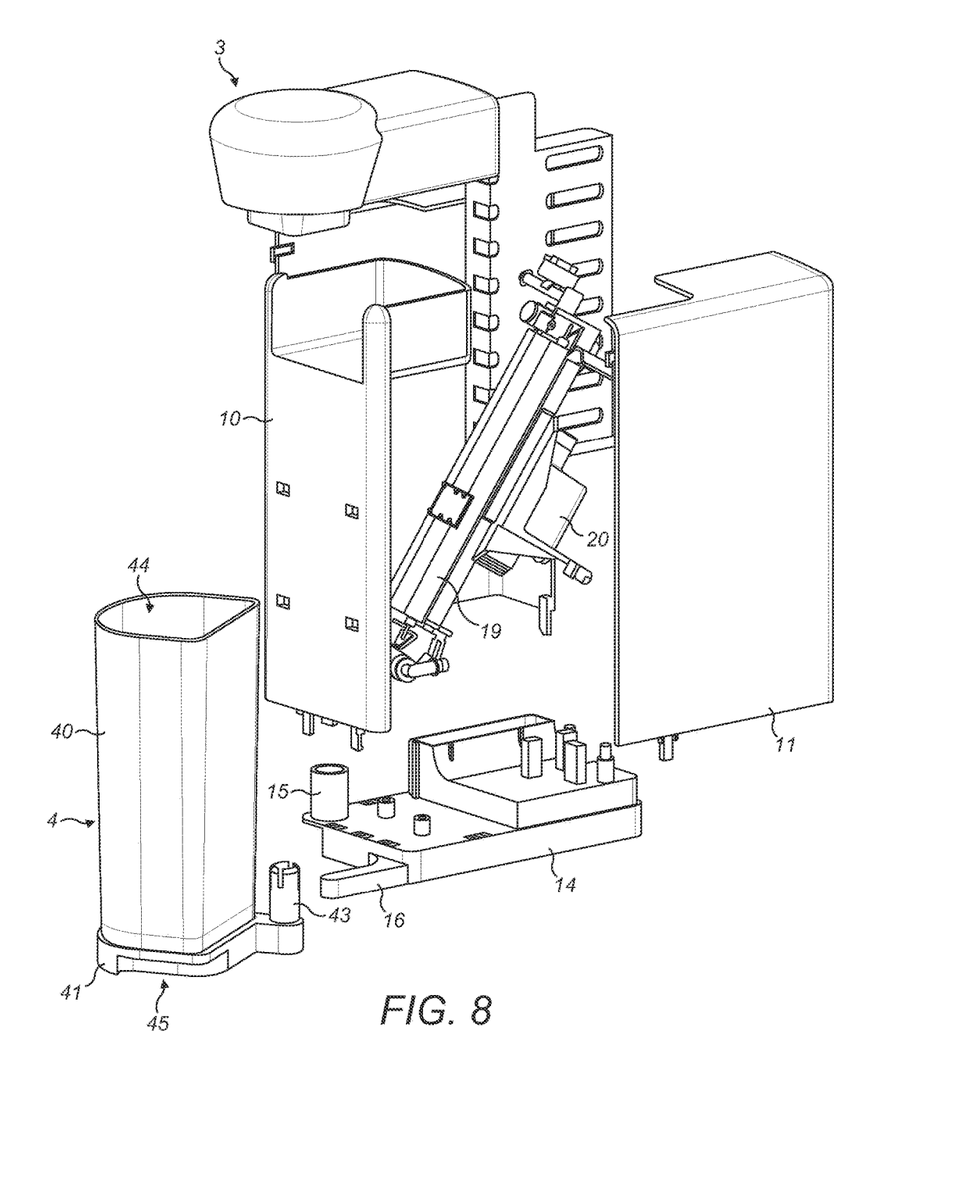
FIG. 8 is an exploded perspective view of the beverage preparation machine of FIG. 4 with certain parts omitted for clarity.

FIGS. 7 and 8 show internal detail of the beverage preparation machine 1 (although some parts are omitted for clarity). As best shown in FIG. 8, the pivot mechanism of the water reservoir 4 is achieved by providing the base 41 of the water reservoir 4 with a hollow pivot pin 43 that is rotatably mounted to a hollow pivot shaft 15 of the base 14 of the main housing 2. The rotational axis of the pivot point 42 is vertical. This allows the whole water reservoir 4—base 41 and body 40—to be rotated to the position shown in FIG. 4. As best shown in FIG. 4, the base 14 of the main housing 2 is provided with a projecting reservoir guide leg 16 on a side of the main housing 2 opposite the pivot point 42. The reservoir guide leg 16 is shaped and sized to engage in a recess 45 formed in the base 41 of the water reservoir 4 when the water reservoir 4 is in the storage configuration. Detents may be provided on the reservoir guide leg 16 and recess 45 to allow for a click-tight connection between the two parts in the storage configuration.

As shown in FIG. 8, the water path of the beverage preparation machine 1 may comprise a heater 19 and a pump 20. For reasons of clarity the interconnecting hoses (and other components such as the PCB board and control processor) have been omitted from the figure. Advantageously, the water path may extend through the pivot point 42 by utilising a flexible hose that passes within the hollow pivot pin 43 of the base 41 of the water reservoir. This permits the water reservoir 4 to be optionally non-removable from the main housing 2. In other words, the water reservoir 4 may be designed not be disconnected from the main housing 2 during use, even during refilling or emptying of the water reservoir 4. Preferably the water path, within the base 41, comprises a non-return valve to prevent reverse flow of water from the main housing 2 into the water reservoir 4.

In the storage configuration of FIGS. 1 to 3 the water reservoir 4 is located at least partially beneath the brew head 3. Preferably, the water reservoir 4 is located beneath the outlet 31 of the brew head 3 and the water reservoir 4 is positioned adjacent the front face 10 of the main housing 2 so as to minimise the dimensions of the beverage preparation machine 1. It will be appreciated that in the storage configuration the water reservoir 4 is located at the front of the beverage preparation machine 1 (the 'front' being defined as the side intended to face a user of the beverage preparation machine 1 when dispensing a beverage).

When rotated to the beverage dispensing configuration, the water reservoir 4 is moved away from underneath the brew head 3 so as to create a void space 18 as shown in FIG. 4 beneath the outlet 31 of the brew head 3. The void space 18 so created allows the positioning of a receptacle to receive the dispensed beverage. This movement of the water reservoir 4 also increases the overall width of the beverage preparation machine 1 to a width $w_2$ as shown in FIG. 6 that is greater than width $w_1$. This increases the lateral stability of the beverage preparation machine 1 when dispensing a beverage.

As noted above, the dual-purpose lid 50 may be used in the storage configuration to close the upper mouth 44 of the water reservoir 4. In the beverage dispensing configuration the dual-purpose lid 50 may be connected to the front face 10 of the main housing 2 to form a cup stand for a receptacle. To enable this, the front face 10 of the main housing 2 is provided with one or more sets of mounting points 17 for connection of the dual-purpose lid. In the illustrated example two sets of mounting points 17 are provided, each set comprising two holes that are shaped and sized to receive two L-shaped lugs 52 which extend from a rear edge of a body 51 of the dual-purpose lid 50 as shown in FIG. 4. As seen in FIG. 5, the dual-purpose lid 50 may also comprise two support webs 53 on an underside of the body 51.

In use, starting from the storage configuration and with the water reservoir 4 empty, the water reservoir 4 is first rotated into the position shown in FIG. 4 so that the beverage preparation machine is in the beverage dispensing configuration. The dual-purpose lid 50 is removed from the upper mouth 44 and mounted to the desired mounting points 17 on the front face 10. Next a required amount of water is poured into the body 40 of the water reservoir 4 and a suitable receptacle is placed on the cup stand formed by the body 51 of the dual-purpose lid 50. Finally the brew head 3 is opened, a suitable pre-packaged container of ingredients is inserted and the brew head 3 closed. Closure automatically initiates the brew cycle and dispensation of a beverage. Said brew cycle involves operation of the pump 20 and heater 19 to convey water from the water reservoir 4 via the water path to the brew head 3 while at the same time heating the water to the required temperature. Once dispensation has been completed the beverage preparation machine 1 may be returned to the storage configuration in order to minimise worktop (or storage) space until next required.

Figure 9:
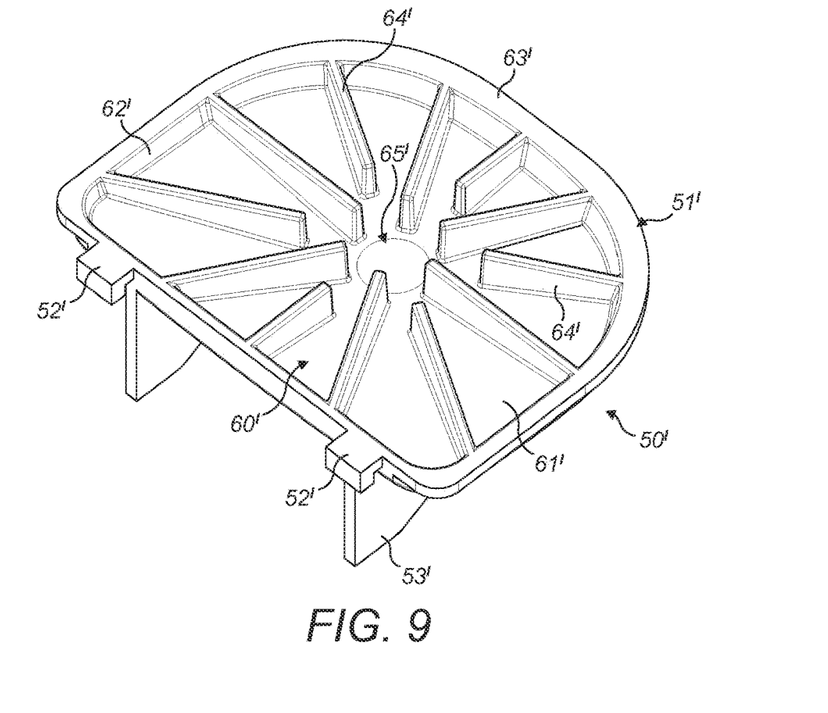
FIGS. 9 and 10 are perspective views of an alternative dual-purpose lid for use with the beverage preparation machine of the present disclosure.
Figure 10:
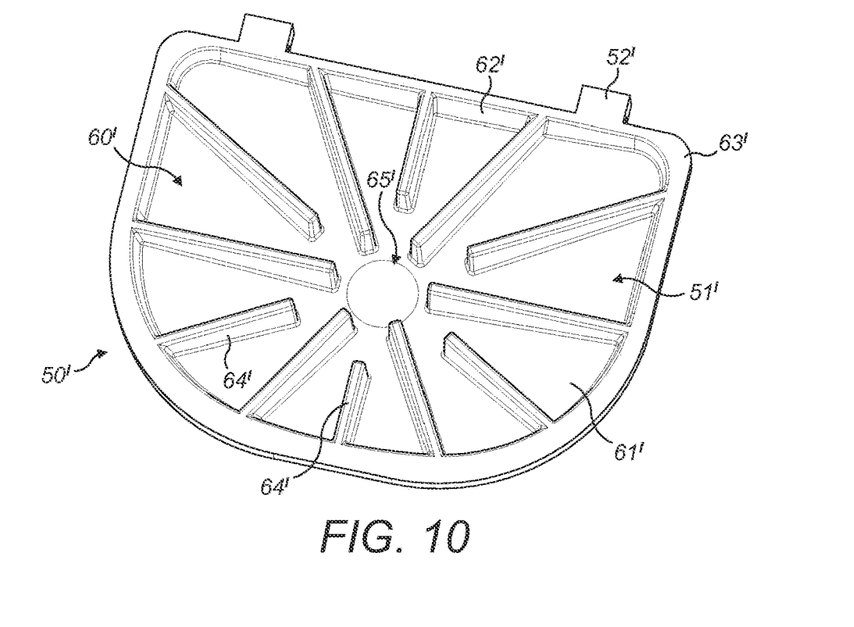

FIGS. 9 and 10 illustrate an alternative design of dual-purpose lid 50' which may form part of the beverage preparation machine of the present disclosure. In the following, like components to those previously described have been referenced using like reference numerals. In the same way as described above the dual-purpose lid 50' may be used in the storage configuration to close the upper mouth 44 of the water reservoir 4 and in the beverage dispensing configuration the dual-purpose lid 50' may be connected to the front face 10 of the main housing 2 to form a cup stand for a receptacle. As before, the dual-purpose lid 50' is provided with two L-shaped lugs 52' which extend from the rear edge of the body 51' of the dual-purpose lid 50' as shown in FIG. 9 and which engage in use with the desired mounting points 17 on the front face 10. As above, the dual-purpose lid 50' may comprise two support webs 53' on the underside of the body 51'. An upper side of the body 51' is not flat as above but instead comprises a receptacle 60' for collection of liquid over-spilling in use from a receptacle or dripping from the outlet 31. The receptacle 60' is defined by a base wall 61', an upstanding side wall 62' and a flange 63' of the body 51'. The receptacle 60' is preferably shallow with the upstanding side wall 62' only having a height in the range of 2 to 12 mm. Consequently, the volume of liquid able to be held by the receptacle 60' is small and in the range of 6 to 15 ml and is primarily intended to catch and hold drips at the end of a single brew cycle and not to retain large quantities of fluid in the eventuality that the receptacle is removed from the dual-purpose lid 50' before the end of the brew cycle. In use, the dual-purpose lid 50' is intended to be emptied and washed after each use and before reverting the beverage preparation machine into the storage configuration. Thus, having a small volume for the receptacle 60' is adequate and has the advantage that the depth of the dual-purpose lid 50' can be kept small.

The receptacle 60' is sub-divided into a plurality of segments by a series of ribs 64' which extend upwardly from the base wall 61'. The ribs 64' run radially inwardly from the upstanding side wall 62' towards a centre 65' of the dual-purpose lid 50' but stop short of meeting with one another. An upper free edge of the ribs 64' forms a plurality of support points for the receptacle in use such that the receptacle is held clear of the base wall 61'. In this way the dual-purpose lid 50' is enabled to function as a cup stand when mounted to the front face 10. The ribs 64' also function to stiffen and strengthen the dual-purpose lid 50'.

Preferably the base wall 61' of the receptacle 60' is un-apertured. In other words no drainage point is provided in the base wall 61', for example at the centre 65'. This is advantageous since the dual-purpose lid 50' must function as a lid of the water reservoir 4 and being un-apertured allows for better closure of the water reservoir 4. Consequently, the dual-purpose lid 50' may be simply emptied and cleaned by upending the dual-purpose lid 50' and draining any liquid through the open mouth of the receptacle 60'.

In other respects the dual-purpose lid 50' functions as described above.

Figure 11:
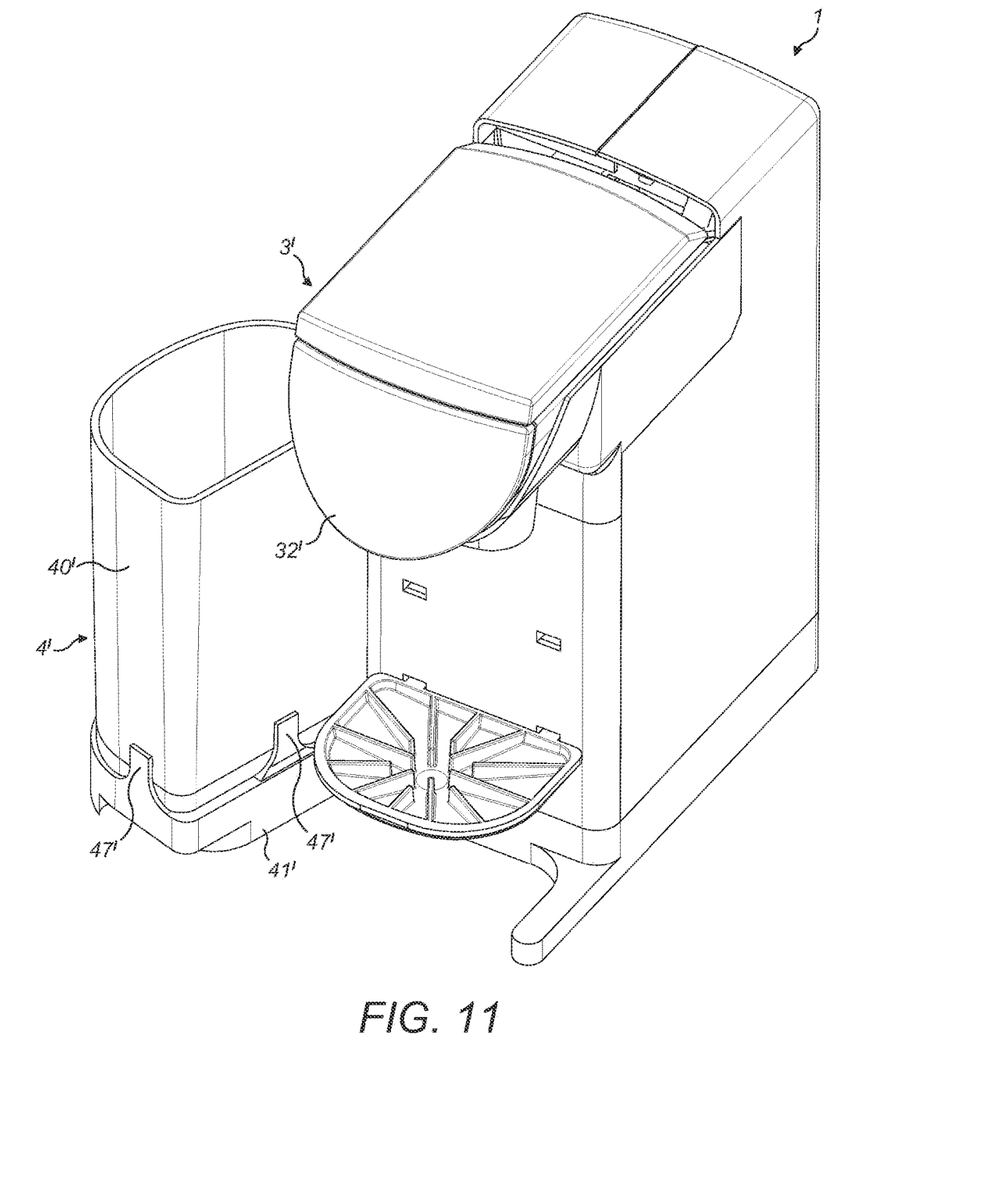
FIG. 11 is a perspective view of another beverage preparation machine according to the present disclosure in its beverage dispensing configuration.

FIG. 11 illustrates an alternative design of a beverage preparation machine 1 of the present disclosure. In the following, like components to those previously described have been referenced using like reference numerals. In most respects the design and function of the beverage preparation machine 1 is the same as the design described above and will not be discussed further. However, in this alternative design the brew head 3' is shaped differently and comprises an angled front face 32' that also forms a handle by which the brew head 3' can be grasped and pivoted upwards to open the brew head 3' to allow insertion of a beverage cartridge. In addition, the base 41' of the water reservoir 4' illustrates the optional feature wherein the body 40' of the water reservoir 4' may be detached from the base 41'. Preferably the base 41' is provided with a plurality of upstanding guide projections 47' which assist in guiding the sliding connection of the body 40' to the base 41' and may also help to retain the body 40' on the base 41' by suitable means, for example an interference frictional fit or a snap-fit connection.

The invention claimed is:

1. A beverage preparation machine comprising:
a main housing having a front and a rear, a top including an upwardly-facing surface, and a bottom including a downwardly-facing surface;
a brew head having an outlet for discharging a prepared beverage;
a water reservoir having a top including an upwardly-facing surface, and a bottom including a downwardly-facing surface; and
a water path for conveying water from the water reservoir to the brew head;
wherein, the water reservoir is movable with respect to the main housing between a storage configuration and a beverage dispensing configuration, wherein in the storage configuration the water reservoir is located at a front of the beverage preparation machine with the downwardly-facing surface of the main housing being co-planar to the downwardly-facing surface of the water reservoir, and the beverage preparation machine has a first overall width across the front of the main housing of the beverage preparation machine; and
wherein in the beverage dispensing configuration the water reservoir is located laterally off-set from a mid-line of the main housing with the downwardly-facing surface of the main housing being co-planar to the downwardly-facing surface of the water reservoir, so as to increase the overall width of the beverage preparation machine across the front of the housing of the beverage preparation machine to a second overall width that is greater than the first overall width in the storage configuration.

2. A beverage preparation machine as claimed in claim 1, wherein the water reservoir forms a stabilising means in the beverage dispensing configuration.

3. A beverage preparation machine as claimed in claim 1, wherein the water reservoir is pivotally connected to the main housing at a pivot point to enable the water reservoir to be pivoted between its storage configuration and beverage dispensing configuration.

4. A beverage preparation machine as claimed in claim 3, wherein the water path comprises a flexible conduit which extends through the pivot point to provide fluid communication between the water reservoir and the main housing.

5. A beverage preparation machine as claimed in claim 3, wherein the pivot point has a vertical axis of rotation.

* * * * *